(12) United States Patent
Lee et al.

(10) Patent No.: US 9,390,053 B2
(45) Date of Patent: Jul. 12, 2016

(54) CACHE DEVICE, CACHE CONTROL DEVICE, AND METHODS FOR DETECTING HANDOVER

(71) Applicant: SK Telecom Co., Ltd., Seoul (KR)

(72) Inventors: Jong Min Lee, Seongnam-si (KR); Kyung Jun Lee, Seongnam-si (KR); Young Jae Shim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 619 days.

(21) Appl. No.: 13/865,713

(22) Filed: Apr. 18, 2013

(65) Prior Publication Data

US 2013/0282855 A1    Oct. 24, 2013

(30) Foreign Application Priority Data

Apr. 20, 2012 (KR) .................. 10-2012-0041498
Mar. 8, 2013 (KR) .................. 10-2013-0025272

(51) Int. Cl.
*G06F 15/167* (2006.01)
*H04W 36/02* (2009.01)

(52) U.S. Cl.
CPC ............. *G06F 15/167* (2013.01); *H04W 36/02* (2013.01)

(58) Field of Classification Search
CPC .............................. G06F 15/167; H04W 36/02
USPC ........................................................ 709/213
See application file for complete search history.

(56) References Cited

U.S. PATENT DOCUMENTS

| | | | |
|---|---|---|---|
| 7,673,190 B1* | 3/2010 | Engelbrecht | G06F 9/30145 714/49 |
| 2003/0159002 A1* | 8/2003 | Betker | G06F 11/3419 711/125 |
| 2006/0002344 A1* | 1/2006 | Ono | H04L 41/5019 370/331 |
| 2007/0143538 A1* | 6/2007 | Sasaki | G11B 20/10527 711/113 |
| 2008/0151817 A1* | 6/2008 | Fitchett | H04W 28/20 370/329 |
| 2008/0189487 A1* | 8/2008 | Craske | G06F 12/0859 711/125 |
| 2009/0282159 A1* | 11/2009 | Wang | H04L 61/609 709/231 |
| 2010/0034089 A1* | 2/2010 | Kovvali | H04W 28/0231 370/235 |
| 2011/0083048 A1* | 4/2011 | Yan | H04W 36/0016 714/57 |
| 2011/0320629 A1* | 12/2011 | Wu | H04N 21/4302 709/231 |
| 2012/0051349 A1* | 3/2012 | Teyeb | H04W 36/02 370/338 |
| 2012/0106514 A1* | 5/2012 | Zheng | H04W 36/32 370/331 |
| 2012/0120915 A1* | 5/2012 | Wang | H04W 36/08 370/331 |
| 2012/0218970 A1* | 8/2012 | Westberg | H04L 67/28 370/331 |
| 2012/0297009 A1* | 11/2012 | Amir | H04L 12/66 709/213 |
| 2012/0300747 A1* | 11/2012 | Westberg | H04W 36/0011 370/331 |
| 2013/0003708 A1* | 1/2013 | Ko | H04W 4/18 370/338 |

FOREIGN PATENT DOCUMENTS

JP    2005346547 A    * 12/2005

* cited by examiner

*Primary Examiner* — Kostas Katsikis
(74) *Attorney, Agent, or Firm* — Hauptman Ham, LLP

(57) ABSTRACT

For a user terminal connected to one of cache devices distributed in a network and receiving contents, terminal access information including terminal address information about the user terminal and identification information of the cache device is stored and managed. If a content retransmission request message of the user terminal is detected at other cache device, this is regarded as a handover of the user terminal. This allows a simple detection of handover that occurs during content transmission.

15 Claims, 10 Drawing Sheets

CACHE DEVICE, CACHE CONTROL DEVICE, AND METHODS FOR DETECTING HANDOVER

CROSS-REFERENCE TO RELATED APPLICATION

The instant application is based on, and claims priority from, KR Application Serial Number 10-2012-0041498, filed on Apr. 20, 2012 and KR Application Serial Number 10-2013-0025272, filed on Mar. 8, 2013, in the KIPO (Korean Intellectual Property Office). The disclosure of the above-listed application is hereby incorporated by reference herein in their entirety.

TECHNICAL FIELD

The present disclosure relates to a cache device, a cache control device, and methods for detecting a handover.

BACKGROUND

With the improvement of user terminals such as smartphones and development of mobile communication technology, a user can use various types of contents such as pictures, videos, audios, applications, and the like by accessing a web server provided by a content provider (CP) through a user terminal anytime anywhere. Furthermore, the frequency of using contents through mobile networks (e.g. a mobile communication network) which ensure mobility of users continuously increases.

However, since the number of users who want to access web servers rapidly increases although the number of web servers provided by content providers is limited, many problems including data loss, bottleneck phenomenon, transmission delay, instability such as non-continuous data transmission, etc.

In order to solve these problems, a Content Delivery Network (CDN) is provided.

The CDN is a service for stably transmitting various types of contents such as pictures, movies, music videos, and the like to a user terminal. Specifically, in the CDN service, some or all contents stored in a web server of a content provider located at a distance from a user terminal, e.g., contents having large capacity such as images, videos, and audios, or contents frequently requested by a user terminal, are previously copied and stored in cache devices widely distributed at main points in a network. Upon reception of a content request message from the user terminal, the closest cache device to the user terminal transmits the content to the user terminal in response to the content request message. This may improve a content access speed and stably provide contents.

The CDN service having the above-described advantages is introduced for wired networks first. Although some technologies for applying the CDN service to mobile networks are proposed, a method of effectively detecting a handover of a user terminal which occurs during content transmission in a wireless CDN network has not been provided yet.

For example, in LTE (Long Term Evolution), there are various cases regarded as a handover caused by the movement of user terminal, including a case in which only an eNodeB is changed, a case in which both an eNodeB and an MME (Mobility Management Entity) are changed, a case in which both an eNodeB and an S-GW (Serving Gateway) are changed, a case in which all of an eNodeB, an MME and an S-GW are changed, and a case of transfer from LTE network to 3G network and vice versa (i.e., a vertical handover). For this, however, a cache device should be designed in consideration of the structure and characteristics of each network.

Detecting a handover of a user terminal during content transmission in a mobile network without recognition of the structure and characteristics of the network is a design consideration of the inventor(s).

SUMMARY

In accordance with some embodiments, a cache device may include a storage unit and a controller. The storage unit is configured to store at least one content and terminal access information received from at least one other cache device. The controller is configured to monitor messages transmitted from at least one user terminal for a content retransmission request message, and to extract terminal address information of the user terminal from the content retransmission request message when the content retransmission request message is detected. If the extracted terminal address information is included in the stored terminal access information, the controller is configured to notify a handover of the user terminal to the other cache device which sends the stored terminal access information.

In accordance with some embodiments, a cache control device may include a communication unit, a memory unit, and a control unit. The communication unit is configured to transmit or receive data to or from a plurality of cache devices distributed in a network. The memory unit is configured to store, for each of the plurality of cache devices, terminal access information including terminal address information about one or more user terminals receiving content in a communication area of the cache device and identification information of the cache device. The control unit is configured to receive terminal access information about a user terminal receiving content from one of the plurality of cache devices, to compare the received terminal access information with the terminal access information stored in the memory unit, and to determine, based on the comparison, whether the specific user terminal is handed-over.

In accordance with some embodiments, a method for detecting a handover at a cache device may include receiving a content request message from a user terminal; providing content corresponding to the content request message to the user terminal; extracting terminal address information of the user terminal from the content request message; creating terminal access information including identification information of the cache device and the terminal address information; and transmitting the terminal access information to one or more other cache devices.

DETAILED DESCRIPTION

The following description makes reference to the accompanying drawings in detail. However, one of ordinary skill in the art will understand the following description is not limited to the embodiments specifically disclosed below and is implemented in various forms and the scope of the following description is not limited to the following embodiments. Well known techniques, elements, structures, and processes will be omitted to avoid obscuring the subject matter of the disclosure.

Hereinafter, a content providing system will be described with reference to FIG. 1.

Figure 1:
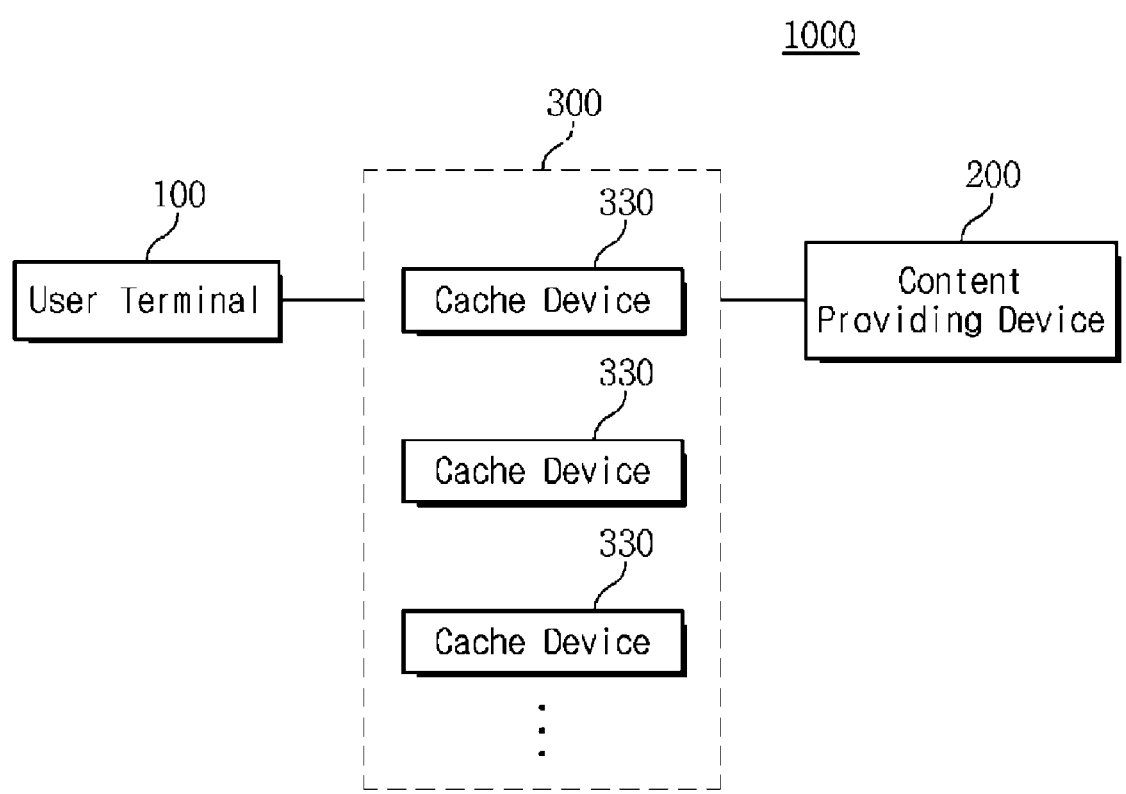
FIG. 1 is a schematic block diagram of a content providing system.

FIG. 1 is a schematic block diagram of a conventional content providing system.

Referring to FIG. 1, a content providing system 1000 may include a user terminal 100, a content providing device 200, and a plurality of cache devices 330 which are distributed in a network 300.

The user terminal 100 is configured to receive contents from the content providing device 200 at user's request. Specifically, the user terminal 100 receives a request for specific content from a user. Here, a user may enter a request by selecting a desired one of contents displayed on the user terminal 100. Then the user terminal 100 checks a Uniform Resource Locator (URL) of the selected content and acquires the Internet Protocol (IP) address of the content providing device 200 corresponding to the URL through a Domain Name System (DNS). Thereafter, the user terminal 100 sends the request for the selected content to the content providing device 200 and receives the content from the content providing device 200.

The content providing device 200 is configured to provide various types of contents, such as pictures, videos, audios, applications, and the like, to the user terminal 100. The content providing device 200 receives contents from a content provider (CP), manages the received contents, and provides the contents to a plurality of mobile terminals 100 through the network 300.

The plurality of cache devices 330 are distributed in the network 300. Each cache device 330 is configured to store some or all of the contents to be provided to the terminal 100, and to transmit selected content to the user terminal 100 on behalf of the content providing device 200.

Specifically, the content providing device 200 creates copies of contents and provides some or all of the copies to the cache devices 330 distributed in the network 300 according to a predetermined content dispersion policy. Such content dispersion policies may be determined differently depending on CDN operators. Alternatively, by using a mirroring method or a caching method, the cache devices 330 may receive contents from the content providing device 200 and store the contents. In case of a mirroring method, the cache devices 330 may copy traffic being transmitted from the content providing device 200 to the user terminal 100, based on a transparent cache technique. In case of a caching method, the cache devices 330 may store contents requested by the user terminal 100, based on a predetermined cache policy.

Additionally, the content providing system 1000 may further include a GLB (Global Load Balance) device (not shown). In the above-discussed environment in which contents are stored in the cache devices 330, the GLB may be used for selecting the optimum cache device which will provide content to the user terminal 100.

More specifically, the user terminal 100 creates a content request message (e.g. HTTP GET message) including URL information corresponding to specific content at user's request. Then the user terminal 100 acquires the IP address of the content providing device 200 through a DNS (not shown), and transmits the content request message to the content providing device 200. At this time, a GLB device (not shown) linked to the network 300 monitors transmission of the content request message together with the content providing device 200, selects the optimum cache device from among the cache devices 330 distributed in the network 300, and returns the IP address of the selected cache device 330 to the user terminal 100.

For example, the optimum cache device may be the closest cache device to the user terminal 100. Alternatively, the optimum cache device may be determined in consideration of load conditions of the cache devices, types of contents stored in the cache devices, or the like.

Thereafter, when the GLB device (not shown) returns the IP address of the optimum cache device 330 to the mobile terminal 100, the user terminal 100 transmits the content request message to the cache device 330. Then the cache device 330 may provide content corresponding to the content request message to the user terminal 100.

The network 300 in which the plurality of cache devices 330 are distributed refers to a communication network for transmission and reception of information between the user terminal 100 and the content providing device 200. Particularly, the network 300 may be a combination of communication networks based on various wired/wireless communication technologies, such as Internet, Intranet, a mobile communication network, and a satellite communication network, as well as a single communication network. In some embodiments, the network 300 includes a mobile network which wirelessly communicates with the user terminal 100.

Additionally, the network 300 may include a cloud computing system which is connected to the cache devices, stores computing resources such as hardware, software, etc., and provides some computing resources necessary for clients to their terminals. Here, cloud computing refers a computer environment configured to store information of a user in a server on Internet and to allow the user to use the information through various devices anytime and anywhere.

The network 300 includes not only a closed network such as LAN (Local Area Network) and WAN (Wide Area Network) and an open network such as the Internet but also networks such as CDMA (Code Division Multiple Access), WCDMA (Wideband Code Division Multiple Access), GSM (Global System for Mobile Communications), LTE (Long Term Evolution) and EPC (Evolved Packet Core), which have recently received attention, next-generation networks and cloud computing network.

As discussed above, the disclosure relates to a technique to detect a handover of the user terminal 100 in the content providing system 1000 including the plurality of cache devices 330. Particularly, the disclosure relates to a technique to detect a handover of the user terminal 100 which occurs while the content providing system operating in a mobile network provides content.

Hereinafter, a method for detecting a handover of a user terminal in the content providing system configured to operate in a mobile network will be described in detail with reference to FIG. 2.

Figure 2:
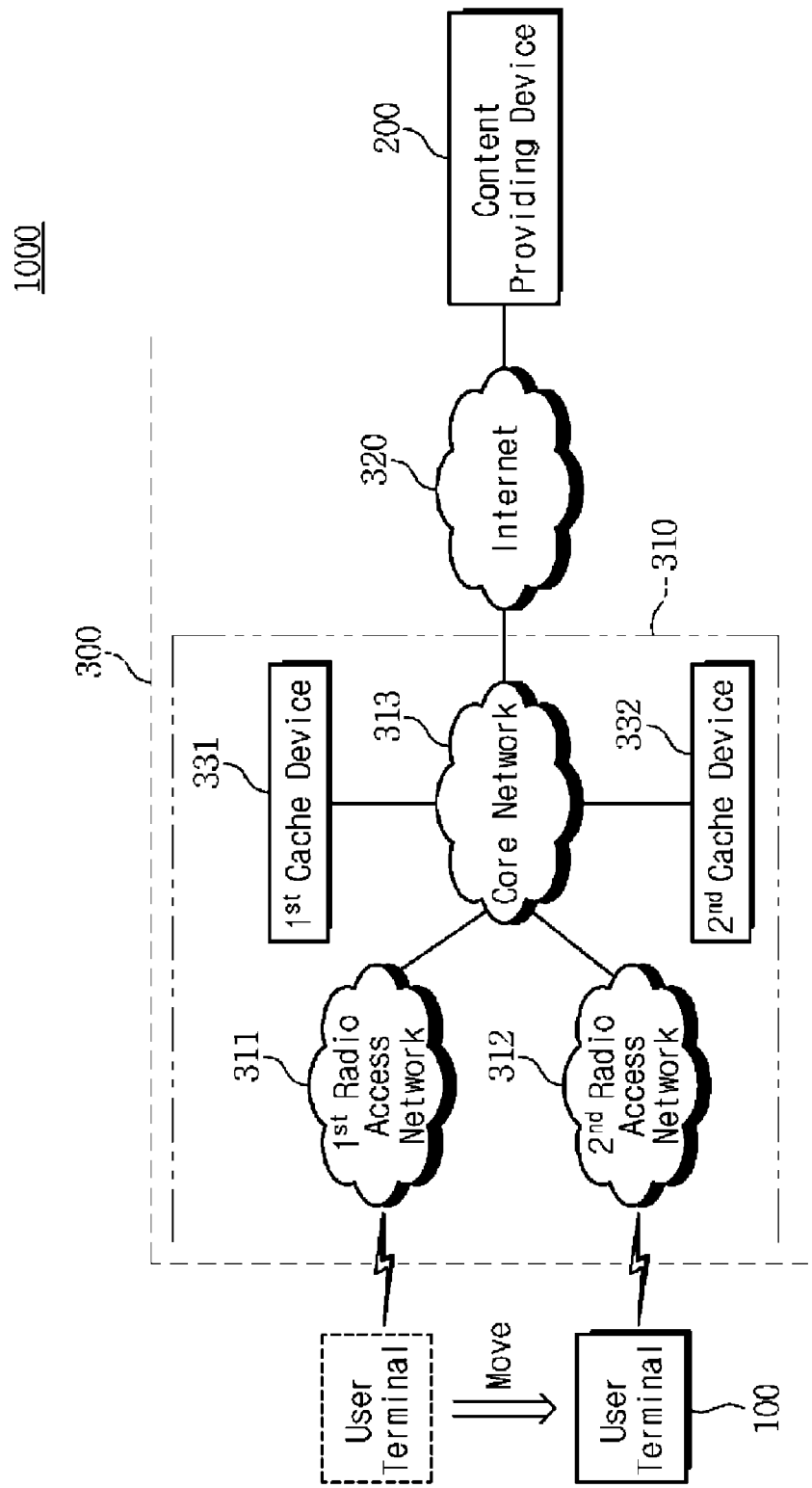
FIG. 2 is a schematic block diagram of a content providing system configured to operate in a mobile network in accordance with at least one embodiment.

FIG. 2 is a schematic block diagram of a content providing system configured to operate in a mobile network in accordance with at least one embodiment.

Referring to FIG. 2, the network 300 of the content providing system 1000 includes a mobile network 310 to which the user terminal 100 makes a wireless access. Also, the mobile network 310 may be connected to an IP network including the Internet 320. Therefore, the user terminal 100 may communicate with the content providing device 200 through the mobile network 310 and the Internet 320.

The mobile network 310 includes a plurality of wireless access networks 311 and 312 and a core network 313. For the purpose of description only, the plurality of wireless access networks will be hereinafter referred to as the first radio access network 311 and the second radio access network 312.

As discussed above, the user terminal 100 for using content provided by the content providing device 200 at user's request may access the mobile network 310. Also, depending on user's movement, the user terminal 100 may perform a handover between the radio access networks 311 and 312 in the mobile network 310.

For example, the user terminal 100 locates in the coverage of the first radio access network 311 and accesses the first radio access network 311. When there is a request for content, the user terminal 100 acquires the IP address of the content providing device 200 through a local DNS (not shown), and transmits a content request message to the content providing device 200 corresponding to the acquired address. Then the user terminal 100 receives content from the content providing device 200 or through a cache device which will be described below.

The first and second radio access networks 311 and 312 which constitute the mobile network 310 perform a wireless communication with the user terminal 100. For example, the radio access networks 311 and 312 may be formed of a plurality of base stations such as BTSs (Base Transceiver Stations), NodeBs and eNodeBs, and a base station controller such as a BSC (Base Station Controller) and RNC (Radio Network Controller).

Alternatively, the radio access networks 311 and 312 may be formed of digital signal processors and radio signal processors which are normally integrated with the base stations but, in this case, separated as digital units (DUs) and radio unit (RUs). The plurality of RUs (not shown) are disposed in a plurality of regions and connected to a centralized DU (not shown).

Additionally, the core network 313 that constitutes the mobile network 310 together with the radio access networks 311 and 312 connects the radio access networks 311 and 312 to any external network, for example, the Internet 320.

The core network 313 is a control system which executes main functions for a mobile communication service such as a call processing, a mobility control and switching between the radio access networks 311 and 312, or the like. The core network 313 administrates and controls a flow of packet in the mobile network 310 and may include various functional elements such as a packet core device (not shown) and a router (not shown) that connects the mobile network 310 and any external network, e.g., the Internet 320. These components that constitute the core network 313 are well known in the art, so detailed description thereof is omitted in the embodiments of the disclosure.

The Internet 320 refers to a communication network through which information is exchanged according to TCP/IP protocol. The Internet 320 is linked to the content providing device 200 and provides content provided by the content providing device 200 to the user terminal 100 via the core network 313 and the first and second radio access networks 311 and 312 or provides the content to the plurality of cache devices 331 and 332 according to a predetermined dispersion policy.

Furthermore, a GLB device (not shown) which disperses loads for content provision may be connected to the Internet 320 or the mobile network 310, especially, the core network 313 to control content distribution to the cache devices 331 and 332 or control the cache devices. For the purpose of description only, the plurality of cache devices will be hereinafter referred to as the first cache device 331 and the second cache device 332.

For example, when the user terminal 100 access the first radio access network 311 at user's request and receives URL information about specific content that the user wants to use, the user terminal 100 creates a content request message and acquires the IP address of the content providing device 200 through a local DNS (not shown). Thereafter, the user terminal 100 transmits the content request message to the content providing device 200. Then the GLB device (not shown) checks the content request message, selects any optimum cache device from among the cache devices distributed at the edge of the mobile network 310, e.g., the first cache device 331 closest to the first radio access network 311, and sends the IP address of the first cache device 331 to the user terminal 100. In this case, the IP address may be transmitted using various known methods such as HTTP redirecting. Thereafter, the user terminal 100 transmits the content request message to the first cache device 331. If there is content corresponding to the content request message received from the user terminal 100, the first cache device 331 provides the content to the user terminal 100. If there is no content, the first cache device 331 may request the content providing device 200 to provide the content, receive the content, mirror the received content, and provide the mirrored content to the user terminal 100.

In still another case, the content request message which is transmitted from the user terminal 100 to the content providing device 200 through the mobile network 310 and the Internet 320 may be checked through mirroring technique by, for example, the first cache device 331 disposed in the mobile network 310. If the first cache device 331 caches the content indicated by the content request message, the first cache device 331 instead of the content providing device 200 may directly provide its own content to the user terminal 100 through the first radio access network 311. If the first cache device 331 fails to cache the content requested, the first cache device 331 delivers the content request message to the content providing device 200 and copies the content being transmitted from the content providing device 200 to the user terminal 100.

Meanwhile, the cache devices 331 and 332 are used to provide contents to the user terminal 100 in the mobile network 310 to which the content providing system is applied. The cache devices 331 and 332 may be distributed at the edge of the core network 313 connected to the first and second radio access networks 311 and 312. For example, using a router (not shown), the cache devices 331 and 332 may be connected respectively between the first and second radio access networks 311 and 312 and a packet core device (EPC) (not shown) of the core network 313.

These cache devices 331 and 332 may be disposed for each radio access network 311 and 312. The cache devices 331 and 332 store some or all contents provided by the content providing device 200 and, instead of the content providing device 200, provides such contents to the user terminal 100 connected to the corresponding radio access network 311 or 312.

A mobile packet is transmitted through a GTP (GPRS Tunneling Protocol) tunnel in the mobile network 310 unlike a case in the Internet 320. For example, when the user terminal 100 transmits a content request message for requesting any content provided by the content providing device 200, an IP packet including origin address information (i.e., the IP address of the user terminal 100) and destination address information (i.e., the IP address of the content providing device 200) is transmitted to the first radio access network 311. Then the base station (e.g. eNodeB) of the first radio access network 311 adds a GTP header, a UDP header and an IP header for GTP tunneling to the IP packet to convert the IP packet into a mobile packet, and transmits the mobile packet to the core network 313. The GTP header may include tunneling end point ID (TEID) allocated to the user terminal 100. The core network 313 may remove the GTP header, the UDP header and the IP header for GTP tunneling from the mobile packet, and transmit the IP packet, received from the user terminal 100, to the content providing device 200 through the Internet 320.

The first cache device 331 monitors the mobile packet transmitted from the first radio access network 311 using mirroring technique to confirm the content request message of the user terminal 100 and, when the content requested by the user terminal 100 is stored in the first cache device 331, transmits the stored content to the user terminal 100 through the first radio access network 311.

To achieve this, the first cache device 331 converts data of the content into a mobile packet containing a GTP header, a UDP header and an IP header for GTP tunneling, and transmits the mobile packet to the first radio access network 311. Then the first radio access network 311 may remove the GTP header, UDP header and IP header for GTP tunneling from the received mobile packet, and transmit the data of the content to the user terminal 100 in a radio section.

While content is provided to the user terminal 100, the first and second cache devices 331 and 332 detect a handover of the user terminal 100.

For the purpose of description only, it is supposed hereinafter that each of the cache devices 331 and 332 provides any content by means of mirroring technique, namely, copies a mobile packet transmitted through the mobile network 310 without affecting traffic and then provides it to the user terminal 100. This is, however, exemplary only and not to be considered as a limitation of the disclosure. Alternatively, each cache device may transmit any stored content to the user terminal 100 by means of caching technique.

Referring to FIG. 2, the user terminal 100 linked to the first radio access network 311 to receive any content from the first cache device 331 may move to the second radio access network 312. When providing the content to the user terminal 100, the first cache device 331 creates terminal access information which indicates that the content is being provided to the user terminal 100 in an area currently supported by the first cache device 331. Also, the first cache device 331 sends the terminal access information to other cache devices, for example, the second cache device 332. The terminal access information includes origin address information of the user terminal 100, especially, the IP address of the user terminal 100, extracted from the content request message, and identification information of the cache device, namely, the identification information of the first cache device 331.

If the user terminal 100 moves to the second radio access network 312, the user terminal 100 which is receiving content from the first cache device 331 through the first radio access network 311 may not receive content any more. Therefore, the user terminal 100 transmits a content retransmission request message to the content providing device 200.

Figure 3:
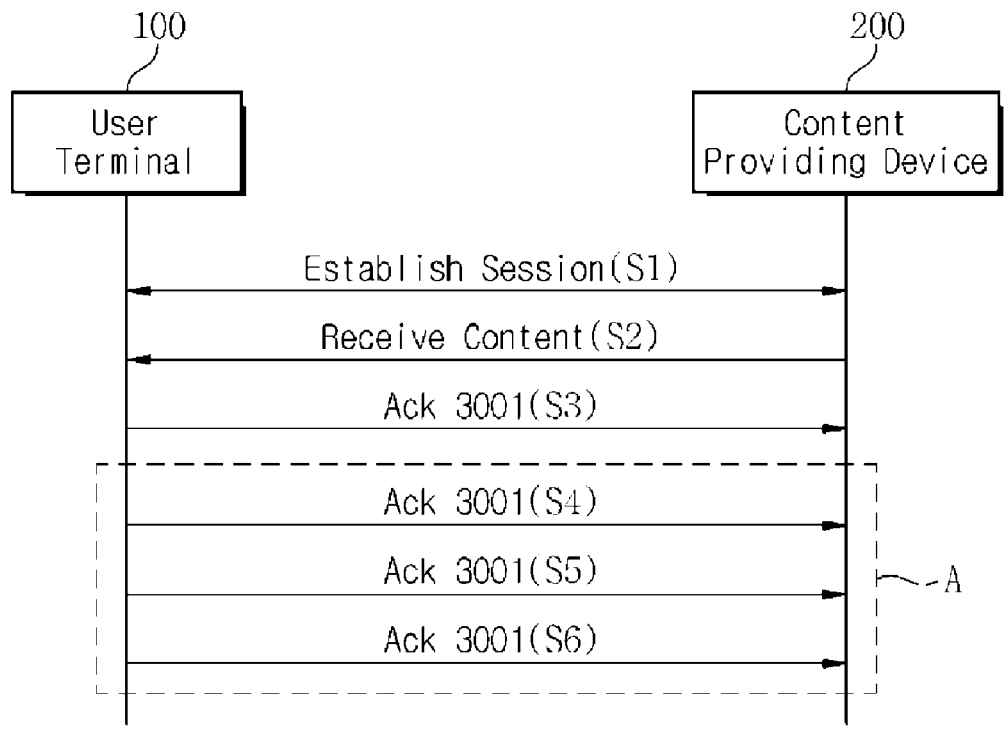
FIG. 3 is a diagram of the detection of a handover in a content providing system configured to operate in a mobile network in accordance with at least one embodiment.

A process of transmitting the content retransmission request message at the user terminal 100 is shown in FIG. 3.

Referring to FIG. 3, in step S1, the user terminal 100 transmits a content request message (e.g. HTTP GET message) to the content providing device 200, and thereby a communication path is established.

Since this step of session establishment is well known in the art, a detailed description thereof is omitted.

In step S2, the first cache device 331 mirrors content received from the content providing device 200 and then provides the mirrored content to the user terminal 100. Although FIG. 3 simply shows that the user terminal 100 receives content from the content providing device 200, the first cache device 331 monitors messages exchanged between the user terminal 100 and the content providing device 200, mirrors content received from the content providing device 200, and provides the mirrored content to the user terminal 100.

Upon successful reception of any content corresponding to the content request message, the user terminal 100 transmits a response message (e.g. ACK message) that indicates that the content has been successfully received. Here, the user terminal 100 attaches a sequence number to the ACK message and transmits the ACK message with the sequence number to the content providing device 200. For example, when the user terminal 100 has successfully received the content data packets #0 to #3000 among all content data packets, the user terminal 100 sends an ACK message that instructs the content providing device 200 to transmit the data packet #3001.

In a normal process, the user terminal 100 will receive the data packet #3001 from the content providing device 200. However, if the user terminal 100 moves from the first radio access network 311 to the second radio access network 312 as shown in FIG. 2, the user terminal 100 may fail to receive mirrored content from the content providing device 200, more accurately, from the first cache device 331.

Since the user terminal 100 fails to successfully receive content, the user terminal 100 transmits a content retransmission request message to the content providing device 200. The content retransmission request message may be confirmed by checking a sequence number attached thereto. Namely, when content is not successfully received from the content providing device 200, the user terminal 100 repeatedly transmits, to the content providing device 200, response messages (e.g., ACK 3001) having the same sequence number as that of the last message which has been transmitted to the content providing device 200 as indicated by a reference letter "A" including steps S4 to S6. Therefore, when the content retransmission messages having the same sequence number are repeatedly monitored, the second cache device 332 linked to the second radio access network 312 to which the user terminal 100 has moved determines that the user terminal 100 performs a handover.

More specifically, when receiving the content retransmission request message from the user terminal 100, the second cache device 332 extracts origin address information, i.e., the IP address of the user terminal 100, from the content retransmission request message, and determines whether the extracted IP address is included in the terminal access information received from neighboring cache devices including the first cache device 331. If so, this means that the user terminal 100 has moved to the coverage of the second radio access network 312 from the coverage of the first radio access network 311 supported by the first cache device 331. Therefore, when detecting any content retransmission request message having, as origin address information, IP address information found in any other cache device, the second cache device 332 determines it as a handover.

As discussed above, by monitoring messages transmitted to or received from the user terminal 100 and using a content retransmission request message, it is possible to easily detect a handover of the user terminal 100 without modification of system design.

Also, by detecting a handover through message transmitted to or received from user terminal 100, it is possible to easily detect a handover and easily realize a system without considering structures and characteristics of various networks.

Discussed heretofore is the method for detecting a handover of the user terminal 100 in the content providing system operating in a mobile network according to at least one embodiment of the disclosure.

Although the above-discussed mobile network 310 may further include any configuration for performing various functions other than the above-discussed configuration, only the configuration necessary to understand a mobile content providing process is described hereinbefore.

Additionally, although TCP/IP protocol is used hereinbefore as an example, the disclosure is not limited thereto.

Hereinafter, the configuration and operating method of a cache device in accordance with at least one embodiment of the disclosure will be described in detail.

Figure 4:
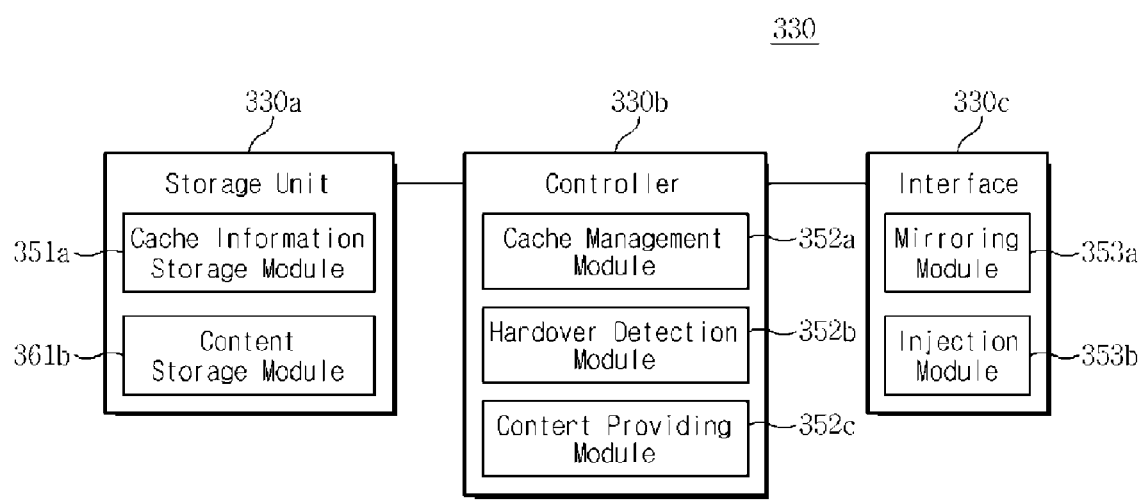
FIG. 4 is a block diagram of a cache device in accordance with at least one embodiment.

FIG. 4 is a block diagram of a cache device in accordance with at least one embodiment.

For reference, the plurality of cache devices 330, 331 and 332 shown in FIGS. 1 and 2 have different content providing areas but have the same configuration and operation.

Referring to FIGS. 2 and 4, the cache device 330 is configured to include a storage unit 330a, a controller 330b, and an interface 330c. The cache device 330 includes one or more physical, actual storage devices. Examples of physical, actual storage devices include, but are not limited to, magnetic media such as, a hard disk, a floppy disk, and a magnetic tape, optical media such as a CD-ROM and a DVD, magneto-optical media such as a floptical disk, and a hardware device configured especially to store and execute a program, such as a ROM, a RAM, a solid state drive, and a flash memory. The controller 330b is, for example, a controller of the cache device 330 and is implemented by one or more programmed processors and/or application-specific integrated circuits (ASICs).

The storage unit 330a is configured to store some or all of contents provided from the content providing device 200. Particularly, the storage unit 330a may store some or all of contents selected according to a predetermined dispersion policy or caching policy.

The storage unit 330a may further store terminal access information associated with content provision received from one or more other cache devices by the controller 330b which will be described below.

Also, the storage unit 330a may store identification information of its own cache device 330 and position information or identification information of any other cache device, e.g., a neighboring cache device. Such information is used for creating the terminal access information which indicates that content is being provided to the user terminal 100 located in the area currently supported by the cache device 330.

For this, the storage unit 330a may include a cache information storage module 351a and a content storage module 361b. The cache information storage module 351a stores the identification information of its own cache device, position information or identification information of neighboring other cache devices, and created or received terminal access information. The content storage module 361b stores any content.

The controller 330b is configured to control the whole of content transmission process in the cache device 330 and to manage contents stored in the storage unit 330a according to a predetermined policy. Here, such contents may be received from the content providing device 200 through caching or mirroring technique and then stored.

Additionally, the controller 330b monitors any transmission or reception message being delivered through the allocated radio access network 311 or 312. If it is monitored that the user terminal 100 requests any content, and if the requested content has been already cached, the controller 330b controls to transmit the content to the user terminal 100 on behalf of the content providing device 200.

To provide the requested content to the user terminal 100, the controller 330b may emulate the content into a mobile packet and then send the mobile packet. Here, emulation refers to a process of converting data of the content into a mobile packet to be transmitted from the core network 313 to the first radio access network 311. For example, the mobile packet may be configured in such a manner that a UDP header, a GTP header including tunneling identification information and an IP header for GTP tunneling are added to an IP packet having the user terminal 100 as a destination and also having the first cache device 331 as an origin. The created mobile packet is provided to the user terminal 100.

If the content corresponding to the content request message is not stored in the storage unit 330a, the controller 330a may request an origin server, i.e., the content providing device 200, connected to the Internet 320 to provide the content. Then the controller 330a may provide the received content to the user terminal 100 through mirroring technique. Alternatively, the controller 330a may cache the content received from the content providing device 200 and then, in response to a request for content from other user terminal, provide the content to another user terminal.

Particularly, while any content is provided to the user terminal 100, the controller 330b creates terminal access information indicating that content is being provided to the user terminal 100 located in its own supporting area, and then sends the created terminal access information to any neighboring cache device. Also, when receiving terminal access information from one or more other cache device, the controller 330b stores the received terminal access information in the storage unit 330a.

Additionally, the controller 330b monitors a message transmitted from the user terminal 100 and detects a handover of the user terminal 100 through the monitored message. Namely, as previously described with reference to FIGS. 2 and 3, the controller 330b monitors a message, i.e., mobile packet, transmitted or received through the mobile network 310 via the interface 330c which will be described below. When repeated transmission of a content retransmission request message, namely, an ACK message having the same sequence number, from the user terminal 100 is monitored, the controller 330b detects it as the content retransmission request message and extracts origin address information, i.e., the IP address of the user terminal 100, from the content retransmission request message. Then the controller 330b checks whether the extracted IP address is included in the terminal access information previously stored in the storage unit 330a. If so, the controller 330b regards the user terminal 100 as a handed-over terminal.

Subsequently, the controller 330b checks a previous cache device before a handover of the user terminal 100 through the terminal access information, and notifies a handover by transmitting a handover notification message (e.g., handover request, handover required, handover command, etc.) to the previous cache device.

Also, if such a handover notification message is received from other cache device, the controller 330b extracts the IP address of the user terminal 100 from the handover notification message, checks content provided to a destination corresponding to the terminal address information, and stops content transmission.

Thereafter, the controller 330b creates content information including content identification information and information about a content interruption point, and transmits the content information to the other cache device that has transmitted the handover notification message.

For this, the controller 330b may include a cache management module 352a, a handover detection module 352b, and a content providing module 352c. The cache management module 352a is configured to store contents provided by the content providing device 200 in the storage unit 330a or to manage such contents. The handover detection module 352b is configured to create the terminal access information, to monitor the content request message and the content retransmission request message through messages transmitted or received in the mobile network 310, and to detect a handover through the content retransmission request message. The content providing module 352c is configured to provide contents to the user terminal 100.

The cache device 330 further includes the interface 330c.

The interface 330c is configured to monitor messages, i.e., mobile packet, transmitted through the mobile network 310, and to transmit mobile packet created by the controller 330b to the mobile network 310. For this, the interface 330c may include a mirroring module 353a and an injection module 353b. The mirroring module 353a is configured to copy the mobile packet transmitted through the mobile network 310 and to provide the copied mobile packet to the controller 330b. The injection module 353b is configured to transmit the mobile packet created by the controller 330b to the user terminal 100 through the mobile network 310.

Discussed heretofore through FIG. 4 are the configuration and operation of the cache device in at least one embodiment of the disclosure. Elements shown in FIG. 4 are, however, exemplary only and not to be considered as a limitation of the disclosure.

As discussed above, by checking the content retransmission request message received from the user terminal 100, the cache device may easily detect a handover and also allow a simple realization of the system.

Hereinafter, methods for detecting a handover of the user terminal in the content providing system operating in a mobile terminal will be described in detail with reference to FIGS. 5 to 8.

Figure 5:
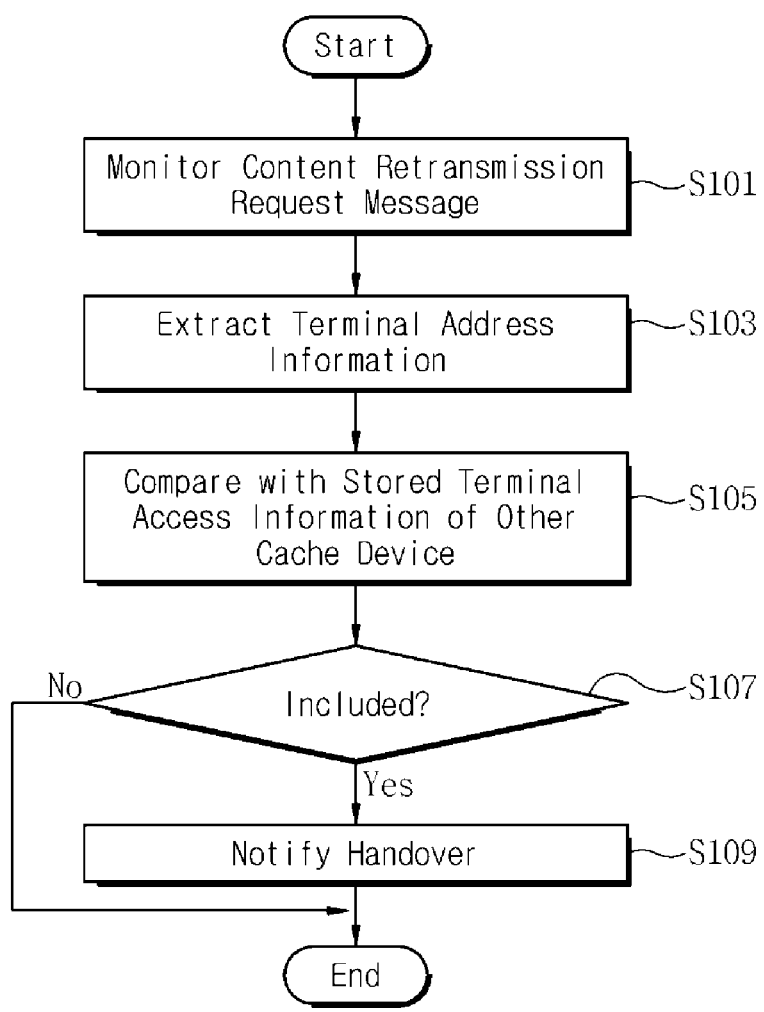
FIG. 5 is a schematic flow diagram of a method for detecting a handover in a content providing system configured to operate in a mobile network in accordance with at least one embodiment.

FIG. 5 is a schematic flow diagram of a method for detecting a handover in a content providing system configured to operate in a mobile network in accordance with at least one embodiment.

For the purpose of description only, it is supposed hereinafter that the first cache device 331 is connected to the first radio access network 311 to which the user terminal 100 is linked before a handover, and the second cache device 332 is connected to the second radio access network 312 to which the user terminal 100 is linked after a handover. This is, however, exemplary only and not to be considered as a limitation of the disclosure. The operation of the first cache device 331 may be performed equally by the second cache device 332, and vice versa.

Referring to FIGS. 2 and 5, each of the cache devices 331 and 332 monitors massages transmitted from the user terminal 100 and checks whether there occurs a content retransmission request message (S101). For example, if the user terminal 100 moves to the second radio access network 312 from the first radio access network 311 while receiving any content in the coverage of the first radio access network 311, the user terminal 100 may not successfully receive the content any more. Therefore, the user terminal 100 transmits the content retransmission request message to the content providing device 200 through the second radio access network 312. The second cache device 332 monitors messages transmitted from the user terminal 100 and detects the content retransmission request message transmitted from handed-over user terminal 100.

If the content retransmission request message is detected, the second cache device 332 extracts terminal address information from the content retransmission request message (S103), and compares the extracted terminal address information with previously stored terminal access information provided by other cache devices (S105). If the extracted terminal address information is included in the stored terminal access information (S107), the second cache device 332 determines that the user terminal 100 providing the content retransmission request message has moved to the second radio access network 312 while receiving the content from other cache device.

This change of radio access networks means a handover. Therefore, the second cache device 332 regards it as a handover of the user terminal 100 and then notifies a handover to the first cache device 331, namely, a cache device that provides the terminal access information regarding the user terminal 100 (S109).

Hereinafter, a handover detection method will be described in more detail with reference to FIG. 6.

Figure 6:
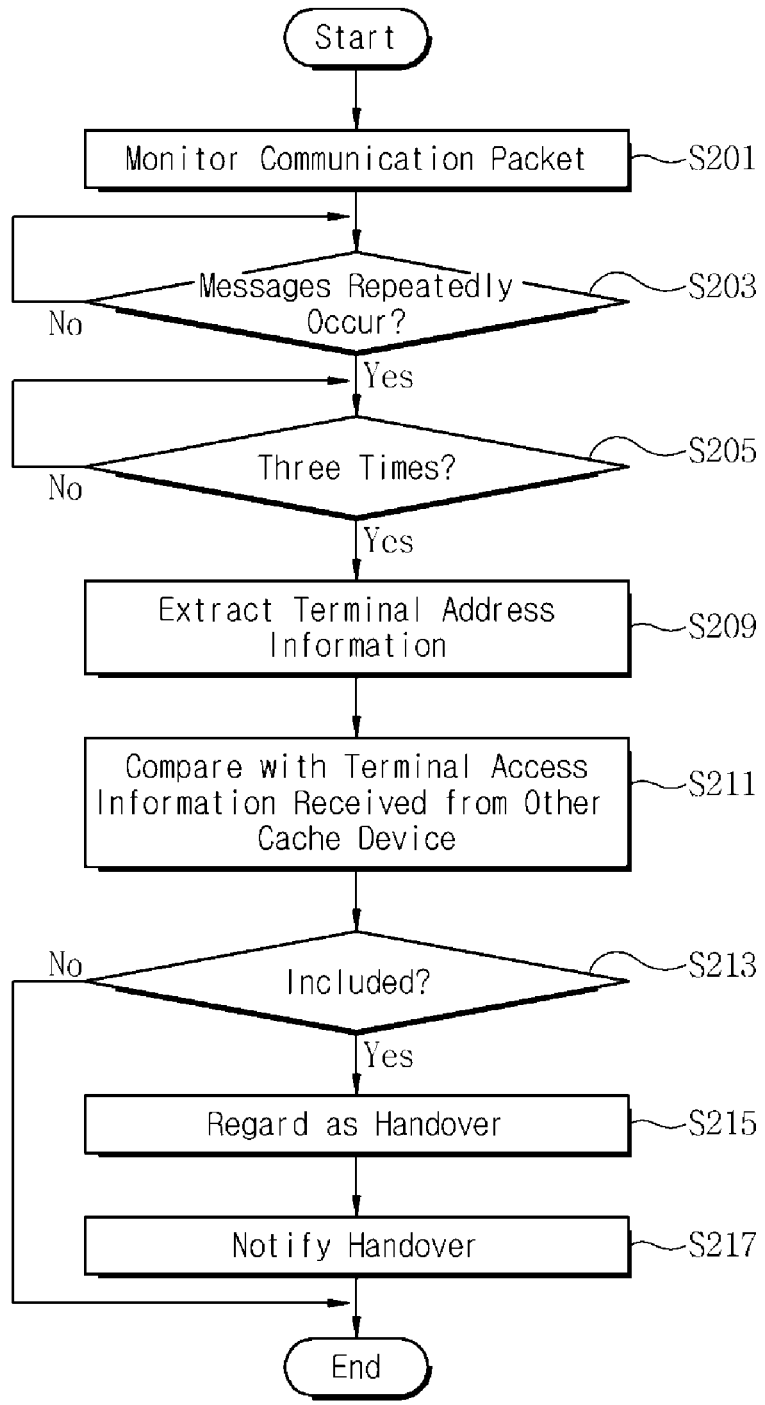
FIG. 6 is a detailed flow diagram of a method for detecting a handover in a content providing system configured to operate in a mobile network in accordance with at least one embodiment.

FIG. 6 is a detailed flow diagram of a method for detecting a handover in a content providing system configured to operate in a mobile network in accordance with at least one embodiment.

Referring to FIGS. 2 and 6, the second cache device 332 monitors a mobile packet, namely, a message transmitted from the user terminal (S201), and determines whether content retransmission request messages, namely, TCP ACK messages repeatedly occur (S203).

Specifically, if the user terminal 100 receiving content from the first cache device 331 moves to the second radio access network 312 from the area supported by the first cache device 331, the user terminal 100 may not receive any more such a content from the first cache device 331. Therefore, the user terminal 100 repeatedly transmits content retransmission request messages, namely, TCP ACK messages having the same sequence number as that of the last message transmitted to the content providing device 200 until packet corresponding to the sequence number is received. If such repeated TCP ACK messages are monitored, the second cache device 332 regards the monitored ACK message as the content retransmission request message. However, the user terminal 100 may often fail to successfully receive content due to any communication failure. In order to exclude this situation, the second cache device 332 defines a threshold value, e.g., three times, and determines whether the repeated occurrence of TCP ACK messages reaches the threshold value (S205).

If TCP ACK messages occur repeatedly as the threshold value, the second cache device 332 extracts terminal address information from the content retransmission request message (S209). Then the second cache device 332 compares the extracted terminal address information with terminal access information previously received from other cache devices, e.g., the first cache device 331 (S211), and thereby determines whether the received terminal access information includes the extracted terminal address information (S213).

If the extracted terminal address information is equal to any terminal access information previously received from another cache device, the second cache device 332 determines that the user terminal 100 is handed-over (S215), creates a handover notification message, and sends the handover notification message to the first cache device 331, namely, the previous cache device used by the user terminal 100 before a handover (S217).

As discussed above with reference to FIGS. 5 and 6, in order to compare the terminal access information received from other cache devices with the terminal address information extracted from the content retransmission request message and then to determine a handover of the user terminal 100, the terminal access information about terminals having access to other cache devices is previously received from such devices, e.g., from the first cache device 331, and stored.

Figure 7:
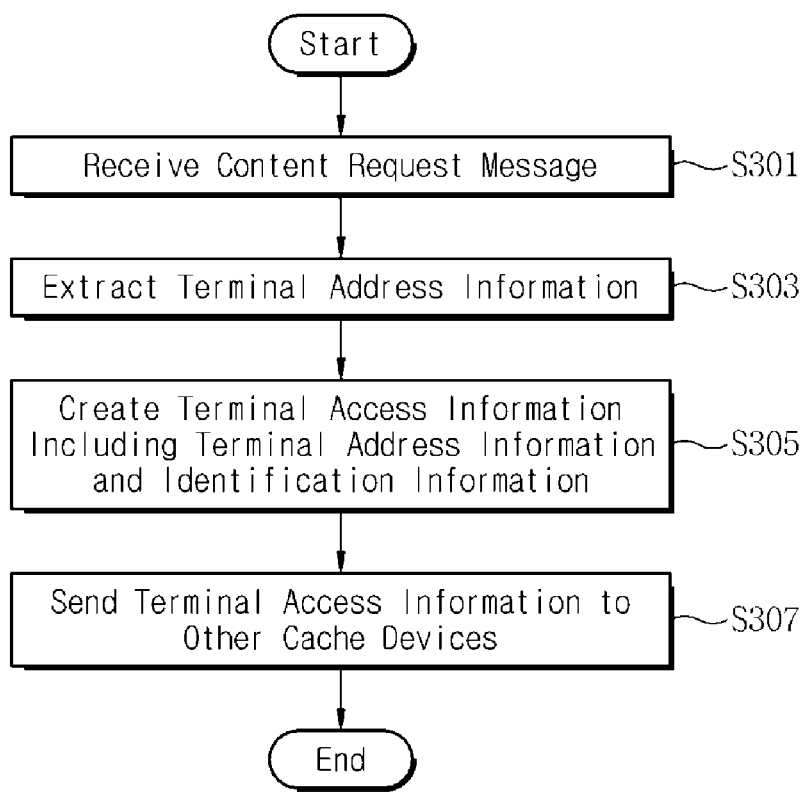
FIG. 7 is a flow diagram of a process for creating and transmitting terminal access information in a handover detection method in accordance with at least one embodiment.

For this, the cache devices 331 and 332 further perform a process shown in FIG. 7.

FIG. 7 is a flow diagram of a process for creating and transmitting terminal access information in a handover detection method in accordance with at least one embodiment.

Referring to FIGS. 2 and 7, each cache device, e.g., the first cache device 331, monitors a message transmitted from the user terminal 100 and checks a content request message (S301). Namely, the user terminal 100 extracts the content request message being transmitted to the content providing device 200 so as to request content. This content request message may be HTTP REQUEST message, for example.

If the content request message is checked as a result of monitoring, the first cache device 331 extracts origin address information, i.e., terminal address information, from the content request message (S303). Then the first cache device 331 creates terminal access information that indicates that the user terminal 100 is located in its own supporting area and also content is being provided to the user terminal 100 (S305). The terminal access information includes the terminal address information extracted from the content request message, and the identification information of the first cache device 331.

Thereafter, the first cache device 331 transmits the terminal access information to at least one other, e.g., a neighboring other cache device, e.g., the second cache device 332 (S307). Therefore, the second cache device 332 may know that the user terminal corresponding to the terminal address information is receiving content through the first cache device 331.

In addition to the above, any content requested in the content request message is provided to the user terminal from the second cache device 332 or from the content providing device 200. Specifically, if the second cache device 332 caches the content requested in the content request message, the second cache device 332 directly provides the requested content to the user terminal. If the requested content is not cached, the content is transmitted from the content providing device 200.

At this time, the second cache device 332 may copy and cache the content through mirroring technique.

Hereinafter, a process performed between the first cache device 331 and the second cache device 332 will be described in detail with reference to FIG. 8.

Figure 8:
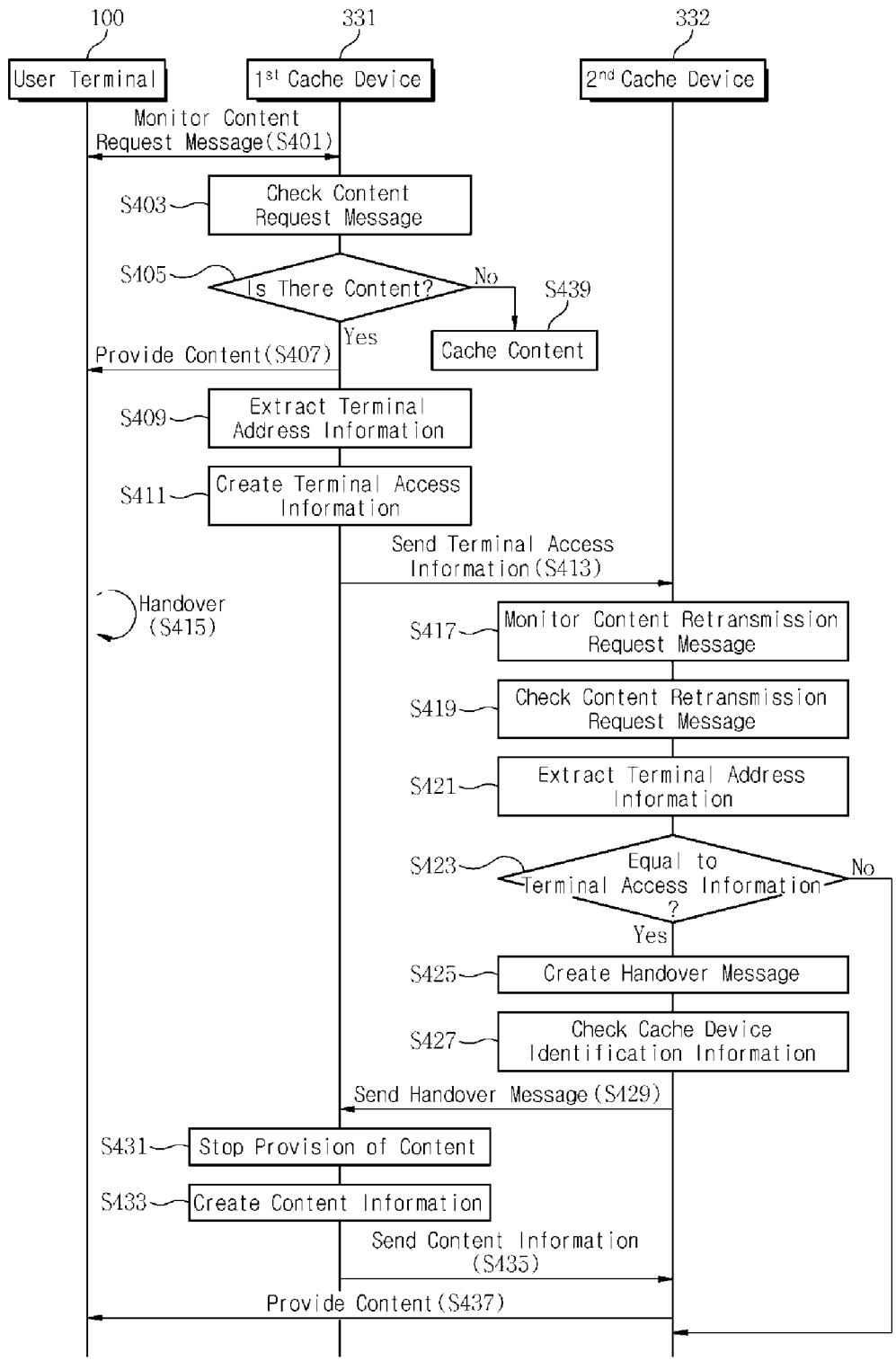
FIG. 8 is a flow diagram of a method for detecting a handover in a content providing system in accordance with at least one embodiment.

FIG. 8 is a flow diagram of a method for detecting a handover in a content providing system in accordance with at least one embodiment.

Referring to FIGS. 2 and 8, each of the cache devices 331 and 332 monitors a packet, i.e., a message transmitted from the user terminal 100 to the content providing device 200 and also checks whether there is a content request message (S401). The following description is based on the assumption that the first cache device 331 checks the content request message transmitted from the user terminal 100.

If the content request message of the user terminal 100 is checked through monitoring (S403), the first cache device 331 checks whether there is content corresponding to the content request message (S405) and provides the corresponding content to the user terminal 100 (S407). If there is no content corresponding to the content request message, the first cache device 331 may request the content providing device 200 to provide the content, receive the content, send the received content to the user terminal 100, and cache the content (S439).

Then the first cache device 331 extracts origin address information, i.e., the IP address of the user terminal 100, from the content request message (S409). Additionally, the first cache device 331 creates terminal access information including the extracted IP address and the identification information of the first cache device 331 (S411), and transmits the created terminal access information to neighboring other cache devices, i.e., the second cache device 332 (S413).

The second cache device 332 stores the terminal access information received from the first cache device 331.

Meanwhile, when a handover is made by the movement of the user terminal 100 from the first radio access network 311 to the second radio access network 312 (S415), the user terminal 100 may not receive content any more through the first radio access network 311. Therefore, the user terminal 100 transmits a content retransmission request message to the content providing device 200.

The second cache device 332 monitors whether there is such a content retransmission request message among messages transmitted or received between the user terminal 100 and the content providing device 200 (S417). If the content retransmission request message is checked (S419), the second cache device 332 extracts the terminal address information from the content retransmission request message (S421). Then the second cache device 332 checks the terminal access information received and stored from the first cache device 331 and determines whether the extracted terminal address information is equal to the stored terminal access information (S423).

If the extracted terminal address information is equal to the stored terminal access information, this means that the user terminal 100 moves from the area supported by the first cache device 331, namely, the first radio access network 311, to the area supported by the second cache device 332, namely, the second radio access network 312. Therefore, the second cache device 332 regards it as a handover of the user terminal 100 and creates a handover notification message (S425). Then the second cache device 332 checks the identification information of the first cache device 331, and transmits the handover notification message to the first cache device (S429).

Upon reception of the handover notification message, the first cache device 331 recognizes that the user terminal 100 is not linked to its own supporting area, namely, the first radio access network 311, and checks whether there is content provided to the user terminal 100. Then the first cache device 331 stops provision of content such that the content is not provided any more to the user terminal 100 (S431).

Additionally, the first cache device 331 creates content information including content identification information and information about a content interruption point (S433), and transmits the content information to the second cache device 332 which corresponds to a region to which the user terminal 100 is handed-over (S435).

Thereafter, the second cache device 332 checks the content information provided by the first cache device 331, and provides content to the user terminal 100 from the content interruption point (S437).

As discussed above, the handover detection method in a mobile network may easily detect a handover without modification of system design by detecting a handover through messages associated with content request and retransmission request transmitted from the user terminal 100. Also, this method may be applied independently regardless of the structure and characteristics of the network.

Although the above discussion are cases of detecting a handover of the user terminal 100 at the cache devices 330, 331 and 332, this is exemplary only and not to be considered as a limitation of the disclosure. Alternatively, a handover of the user terminal 100 may be detected through a separate device that manages the cache devices 330, 331 and 332.

Figure 9:
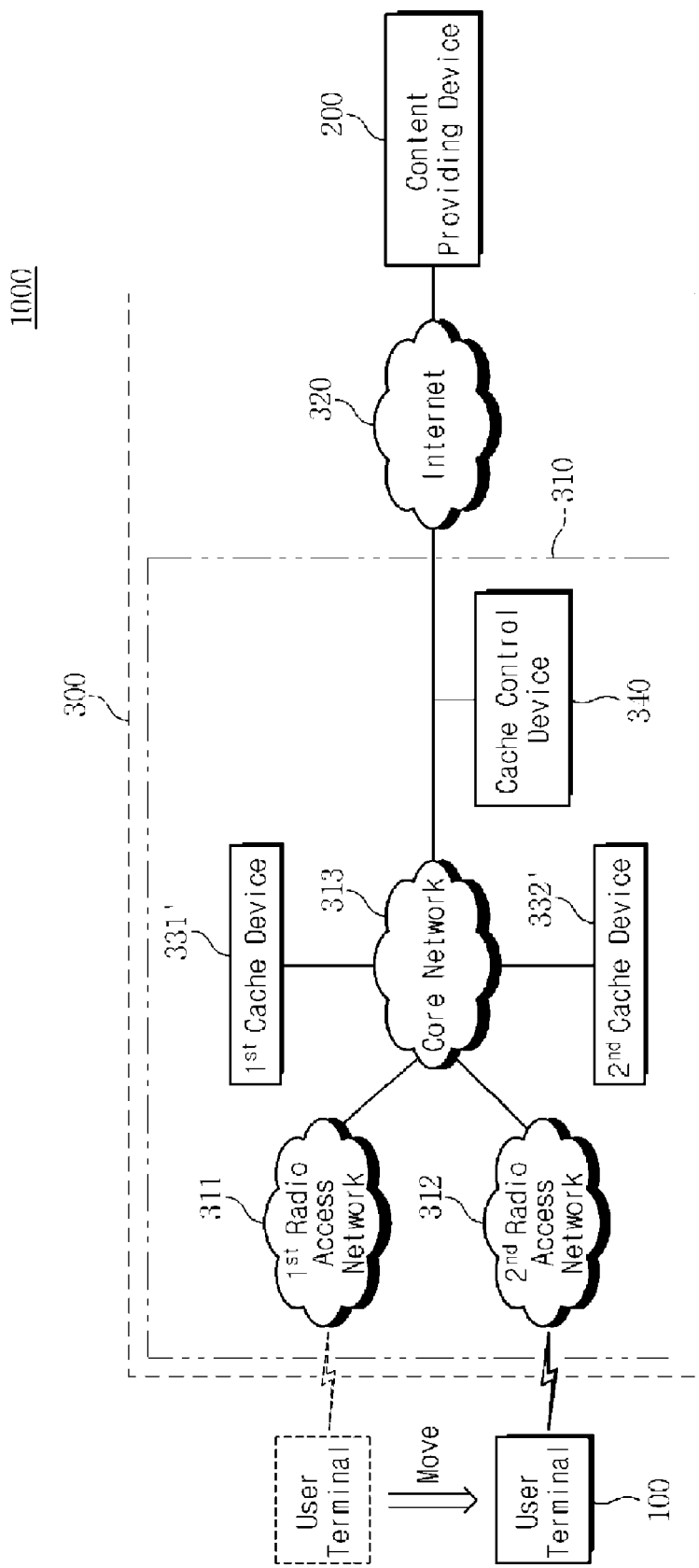
FIG. 9 is a schematic block diagram of a content providing system in accordance with at least one embodiment.

FIG. 9 is a schematic block diagram of a content providing system in accordance with at least one embodiment.

Hereinafter, the same configuration as discussed earlier in FIGS. 1 and 2 will be not described for clarity. For example, in FIG. 9, the network 300 to which the content providing system is applied may have the same structure as that of FIGS. 1 and 2. As discussed above, it is supposed hereinafter that the user terminal 100 is handed-over from the first radio access network 311 to the second radio access network 312.

Referring to FIG. 9, the content providing system may include a cache control device 340 together with a plurality of cache devices 331' and 332' distributed in the mobile network 310. For the purpose of description only, the plurality of cache devices will be referred to as the first cache device 331' and the second cache device 332'.

The first and second cache devices 331' and 332' are connected to different radio access networks of the mobile network 320, e.g., the first and second radio access networks 311 and 312, respectively, and monitor messages of the user terminal 100 transmitted through the first and second radio access networks 311 and 312.

For this, using mirroring technique, the first and second cache device 331' and 332' may copy and analyze messages being transmitted from the user terminal 100 to the content providing device 200 through the first and second radio access networks 311 and 312.

If a content request message transmitted from the user terminal 100 is detected as a result of monitoring, at least one of the first and second cache devices 331' and 332' checks whether any content requested by the user terminal 100 is cached. If so, the cache device sends the requested content to the user terminal 100. If the requested content is not cached, the cache device supports transmission of content from the content providing device 200 to the user terminal 100, copies the transmitting content through mirroring technique, and caches it.

When the content request message is detected, at least one of the first and second cache devices 331' and 332' extracts terminal address information of the user terminal 100 transmitting the content request message, and creates terminal access information including the extracted terminal address information and its own identification information. Then the cache device 331' and 332' transmits the created terminal access information to the cache control device 340.

While monitoring transmission and reception messages of the user terminal 100, at least one of the first and second cache devices 331' and 332' may detect a content retransmission request message transmitted from the user terminal 100. The content retransmission request message may be a TCP ACK message having the same sequence number and repeatedly transmitted. If such TCP ACK messages having the same sequence number are received repeatedly as a threshold value, at least one of the first and second cache devices 331' and 332' may regard it as detection of the content retransmission request message. This content retransmission request message may occur when the user terminal 100 fails to receive a content packet during a handover.

If the content retransmission request message is detected, at least one of the first and second cache devices 331' and 332' extracts the terminal address information of the user terminal 100 from the content retransmission request message. Then at least one of the first and second cache devices 331' and 332' creates the terminal access information including the extracted terminal address information and its own identification information, and transmits the created terminal access information to the cache control device 340. The created terminal address information includes information about a user terminal receiving content in an communication area of at least one of the first and second cache devices 331' and 332'. The communication area is an area which is proper for communicating between a cache device and user terminal, by using a signal which has higher signal quality than predetermined minimum signal quality.

Except for transmitting the terminal access information to the cache control device 340, the first and second cache devices 331' and 332' may have the same operation as that of the above-discussed cache devices 331 and 332.

In this content providing system, the cache control device 340 is configured to determine a handover between different cache devices, namely, the first and second cache devices 331' and 332', and then to control transmission of contents according to a handover. Additionally, the cache control device 340 may further control content caching and transmission of the first and second cache devices 331' and 332'.

The cache control device 340 may be disposed in the core network 313 of the mobile network 310 so as to communicate with the first and second cache devices 331' and 332'. Also, the cache control device 340 may be disposed between the core network 313 and the Internet 320 connected to the content providing device 200, and monitor or control messages transmitted between the user terminal 100 and the content providing device 200. For example, when any content is provided from at least one of the first and second cache devices 331' and 332' to the user terminal 100, the cache control device 340 may block the inflow of contents into the mobile network 310 from the content providing device 200.

Particularly, the cache control device 340 receives the terminal access information transmitted in response to detection of the content request message or the content retransmission request message, from the network 300, especially the plurality of cache devices, i.e., the first and second cache devices 331' and 332', distributed in the mobile network 310, and then stores it for each cache device. The terminal access information stored in the cache control device 340 indicates information about the user terminal 100 that receives contents through access to the first and second radio access network 311 and 312 corresponding to the first and second cache devices 331' and 332'.

Additionally, when receiving from at least one of the first and second cache devices 331' and 332' the terminal access information of the user terminal 100 which is currently receiving contents in the communication area of the cache device, the cache control device 340 compares the received terminal access information with stored terminal access information of each cache device and then determines whether the user terminal 100 is handed-over. For example, if the cache control device 340 receives the terminal access information according to detection of the content retransmission request message from the second cache device 332' after storing the terminal access information received from the first cache device 331', and if a comparison between the received terminal access information and the stored terminal access information shows a match of terminal address information and a mismatch of identification information of cache device, the cache control device 340 determines that the user terminal 100 corresponding to the terminal address information is handed-over from the area of the first cache device 331' to the area of the second cache device 332'.

After determining that the user terminal 100 is handed-over, the cache control device 340 notifies a handover of the user terminal 100 to the cache terminal mapped with the same terminal access information, e.g., the first cache terminal 331'.

Also, after determining that the user terminal 100 is handed-over, the cache control device 340 may transmit information about content data, transmitted to the user terminal 100 by the previous cache device, i.e., the first cache device 331', to the handed-over cache device, i.e., the second cache device 332'. Therefore, by referring to such information about content data, the second cache device 332' may continuously transmit contents to the user terminal 100.

In this case, the cache control device 340 may receive this information about content data transmitted to the user terminal 100, from the cache device receiving a notification of a handover of the user terminal 100, i.e., from the first cache device 331'.

Meanwhile, if the user terminal 100 is not handed-over, the cache control device 340 further stores the received terminal access information. If the user terminal 100 is handed-over, the cache control device 340 replaces identification information of cache device contained in the stored terminal access information with identification information of cache device contained in the received terminal access information.

Figure 10:
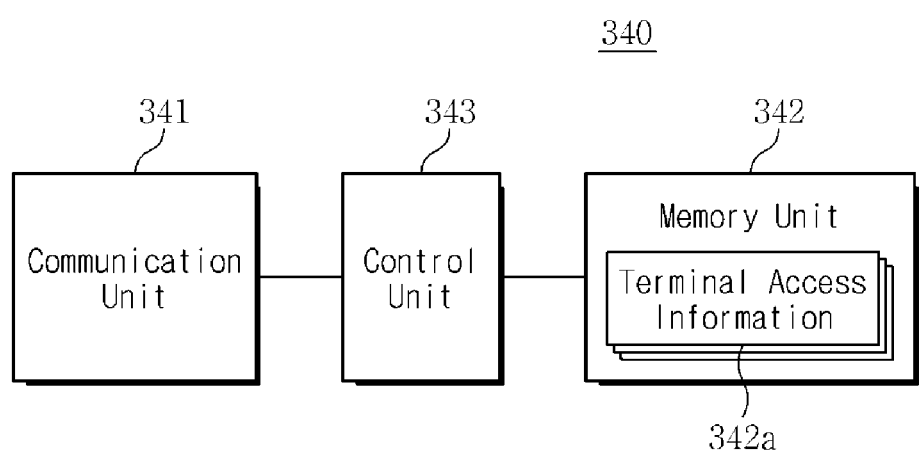
FIG. 10 is a schematic block diagram of a cache control device in accordance with at least one embodiment.

FIG. 10 is a schematic block diagram of a cache control device in accordance with at least another embodiment.

Referring to FIG. 10, the cache control device 340 may include a communication unit 341, a memory unit 342, and a control unit 343. The cache control device 340 includes one or more physical, actual storage devices. Examples of physical, actual storage devices include, but are not limited to, magnetic media such as, a hard disk, a floppy disk, and a magnetic tape, optical media such as a CD-ROM and a DVD, magneto-optical media such as a floptical disk, and a hardware device configured especially to store and execute a program, such as a ROM, a RAM, a solid state drive, and a flash memory. The control unit 343 is, for example, a controller of the cache control device 340 and is implemented by one or more programmed processors and/or application-specific integrated circuits (ASICs).

The communication unit 341 is configured to perform data transmission and reception with the cache devices 331' and 332' and/or the mobile network 310. The cache control device 340 may be connected to the cache devices 331' and 332' through a dedicated line, the Internet, or the mobile network 310.

The memory unit 342 is configured to store data and programs required for operations of the cache control device 340. The memory unit 342 also stores the terminal access information 342a about the user terminal 100 which receives contents in each area of the cache device 331' and 332'. The terminal access information 342a is stored for each of the cache devices 331' and 332' distributed in the network 300.

When the terminal access information about the user terminal 100 which is receiving contents in the communication area of a cache device (e.g., the second cache device 332') is received from that cache device, the control unit 343 compares the received terminal access information with the terminal access information stored for each cache device in the memory unit 342, and determines whether the user terminal 100 is handed-over. Specifically, the cache control unit 340 compares the received terminal access information with the stored terminal access information in the memory unit 342, and if there is any terminal access information having matched terminal address information but having mismatched identification information of cache device, determines that the user terminal 100 corresponding to the terminal address information is handed-over.

The terminal access information is transmitted from the first and second cache devices 331' and 332' to the cache control device 340 when the first and second cache devices 331' and 332' detect the content request message or the content retransmission request message transmitted from the user terminal 100.

If it is determined that the user terminal 100 is handed-over, the control unit 343 refers to the identification information of cache device contained in the terminal access information stored in the memory unit 342 and thereby controls the communication unit 341 to notify a handover of the user terminal 100 to the first cache device 331' which was connected to the user terminal 100 before a handover.

Additionally, the control unit 343 may receive, from the first cache device 331' receiving a handover notification, content transmission information regarding content data transmitted to the user terminal 100, and then transmit the received information to the handed-over cache device, i.e., the second cache device 332'.

Meanwhile, if the user terminal 100 is not handed-over, the control unit 343 further stores the received terminal access information in the memory unit 342. If the user terminal 100 is handed-over, the control unit 343 replaces identification information of cache device contained in the terminal access information stored in the memory unit 342 with identification information of cache device contained in the received terminal access information.

Hereinafter, a handover detecting method using the above-discussed cache control device 340 will be described in detail with reference to FIG. 11.

Figure 11:
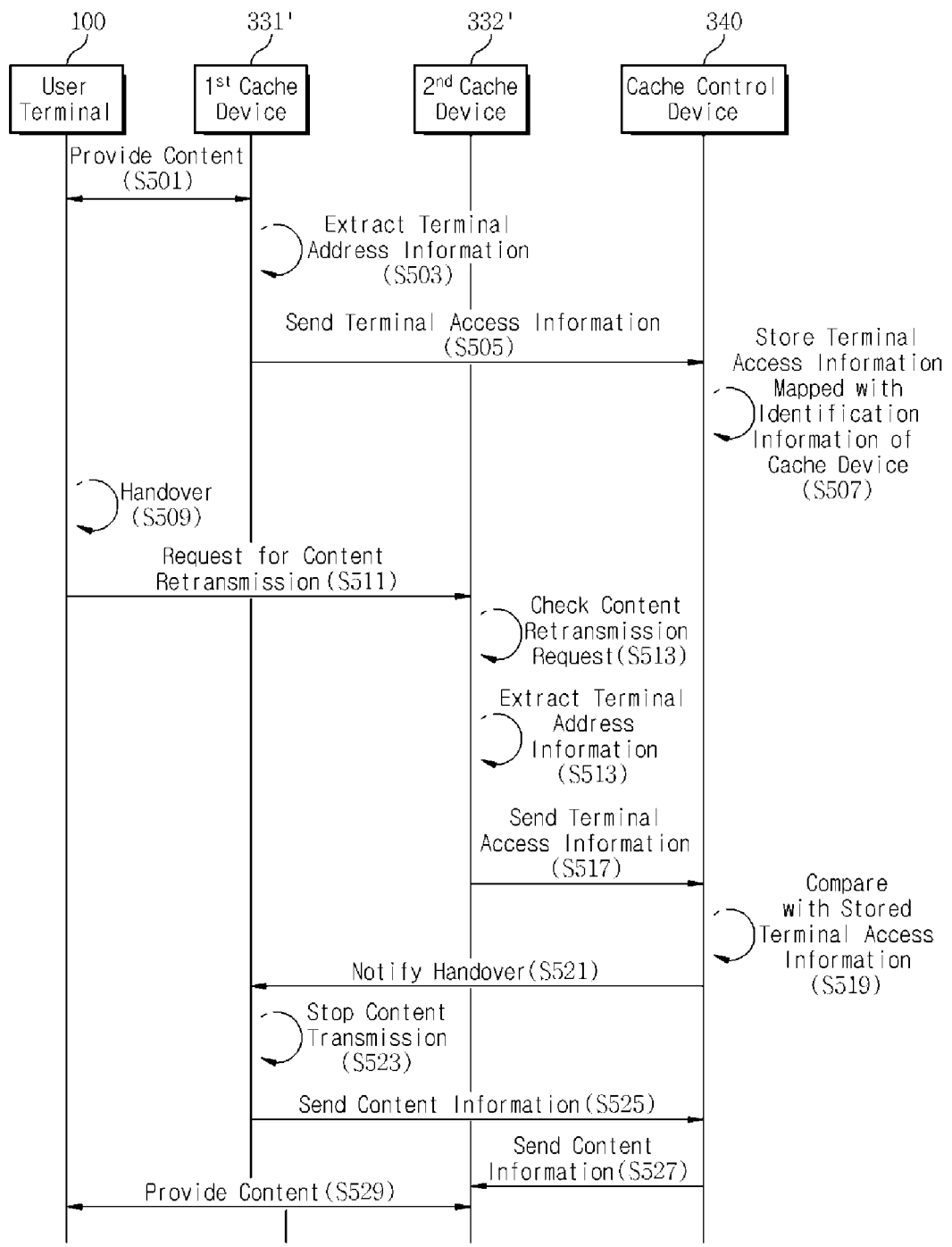
FIG. 11 is a flow diagram of a method for detecting a handover in a content providing system in accordance with at least one embodiment.

FIG. 11 is a flow diagram of a method for detecting a handover in a content providing system in accordance with at least another embodiment.

The following discussion is based on the assumption that the user terminal 100 is handed-over while having access to the first radio access network 311 and receiving contents through the first cache device 331'.

Referring to FIG. 11, when the user terminal 100 accessing the first radio access network 311 receives any content through the first cache device 331' (S501), the first cache device 331' extracts the terminal address information of the user terminal 100 (S503). Then the first cache device 331' creates the terminal access information including the extracted terminal address information and its own identification information and then transmits it to the cache control device 340 (S505). These steps S503 and S505 may be performed when the first cache device 331' detects the content request message of the user terminal 100.

When one of the cache devices 331' and 332' distributed in the network 300 transmits the terminal access information as shown in step S505 in response to detection of the content request messages, the cache control device 340 receives first the terminal access information having the relevant terminal address information and thus stores the received terminal access information therein (S507). In this step, the terminal access information is mapped with identification information of each cache device.

In this state, if the user terminal 100 moves to the coverage of the second radio access network 312, a handover occurs (S509). This causes no transmission of content to the user terminal 100 through the first radio access network 311, so that the user terminal 100 fails to receive packets.

Therefore, the user terminal 100 sends the content retransmission request message for non-received packets through the second radio access network 312 handed-over (S511).

While monitoring messages transmitted through the second radio access network 312, the second cache device 332' connected to the second radio access network 312 detects the content retransmission request message of the user terminal 100 (S513).

Then the second cache device 332' extracts the terminal address information of the user terminal 100 from the content retransmission request message (S515). Additionally, the second cache device 332' creates the terminal access information including the extracted terminal address information and its own identification information, and transmits it to the cache control device 340 (S517).

After receiving the terminal access information from the second cache device 332', the cache control device 340 compares the received terminal access information with the stored terminal access information (S519).

Since the terminal access information transmitted from the first cache device 331' is stored in advance, the cache control device 340 comes to know that the terminal access information with matched terminal address information but with mismatched identification information of cache device is stored previously. The cache control device 340 regards this situation as a handover of the user terminal 100 corresponding to the terminal address information.

Thereafter, by referring to the identification information of cache device mapped with the stored terminal access information, the cache control device 340 notifies a handover of the user terminal 100 to the first cache device 331' to which the user terminal 100 was connected before a handover (S521).

Since the user terminal 100 may not receive contents any more through the first radio access network 311, the first cache device 331' stops content transmission through the first radio access network 311 (S523).

Further, the first cache device 331' may send content transmission information to the cache control device 340 (S525). Here, the content transmission information includes information about an interruption point of content transmission, namely, information that indicates how far completed is content transmission to the user terminal 100.

Then the cache control device 340 transmits the content transmission information to the second cache device 332' to which the user terminal 100 is handed-over (S527). Therefore, the second cache device 332' continuously transmits data after interruption to the user terminal 100 (S529).

Meanwhile, the cache control device 340 receiving the terminal access information in step S505 stores the received terminal access information in the memory unit 342. The reason is that any terminal access information having the same terminal address information has been not stored yet, namely, that the user terminal 100 is not handed-over. On the other hand, the cache control device 340 receiving the terminal access information in step S517 updates the stored terminal access information for each cache device by replacing the cache device identification information contained in the stored terminal access information with the cache device identification information contained in the received terminal access information. The reason is that the received terminal access information has the same terminal address information as that of the stored terminal access information, namely, that the user terminal 100 has been already handed-over.

The handover detection method in the content providing system operating in a mobile network according to the embodiments of the disclosure may be implemented as program commands that can be executed by various computer means and written to a computer-readable recording medium. The computer-readable recording medium may include a program command, a data file, a data structure, etc. alone or in combination. The program commands written to the medium are designed or configured especially for the disclosure, or known to those skilled in computer software. Examples of the computer-readable recording medium include magnetic media such as a hard disk, a floppy disk, and a magnetic tape, optical media such as a CD-ROM and a DVD, magneto-optical media such as a floptical disk, and a hardware device configured especially to store and execute a program command, such as a ROM, a RAM, and a flash memory.

The computer-readable recording medium can be distributed over a plurality of computer systems connected to a network so that processor-readable code is written thereto and executed therefrom in a decentralized manner. Programs, code, and code segments to realize the embodiments herein can be construed by one of ordinary skill in the art.

While the disclosure has been particularly shown and described with reference to exemplary embodiments thereof, it will be understood by those of ordinary skill in the art that various changes in form and details may be made therein without departing from the spirit and scope of the disclosure as defined by the following claims.

The disclosure relates to handover detection technology performed at a cache device or a cache control device by using a content retransmission request message received from a handed-over user terminal.

According to the disclosure, a handover of the user terminal is detected through a content retransmission request message received from the user terminal, and thus the handover can be easily detected without modification of system design regardless of the structure and characteristics of a network. Accordingly, service provision cost can be reduced to develop the mobile industry.

The invention claimed is:

1. A cache device comprising:
   a storage unit comprising a hardware memory configured to store at least one content and terminal access information received from at least one other cache device; and a controller comprising one or more programmed processors configured
> to monitor messages transmitted from at least one user terminal for a content retransmission request message, wherein the content retransmission request message is a request for previously cached content,
> to extract terminal address information of the user terminal from the content retransmission request message when the content retransmission request message is detected, and
> if the extracted terminal address information is included in the stored terminal access information, to notify a handover of the user terminal to the at least one other cache device which sends the stored terminal access information, wherein the controller is further configured
> to extract content requested by the user terminal from the storage unit, and
> to provide the extracted content to the user terminal, and wherein, after notifying the handover of the user terminal to the at least one other cache device, the controller is further configured
> to receive, from the at least one other cache device, content information including content identification information and information about a content interruption point to the user terminal by the at least one other cache device, and
> to provide, to the user terminal, data for a portion after the content interruption point among the content corresponding to the content identification information.

2. The cache device of claim 1, wherein the controller is further configured
to create terminal access information about a user terminal which provides the content, and
to transmit the created terminal access information to the at least one other cache device.

3. The cache device of claim 1, wherein the stored terminal access information includes identification information of the at least one other cache device and terminal address information extracted from the content retransmission request message.

4. A method performed by the one or more programmed processors included in the cache device of claim 1 for detecting a handover, the method comprising:
monitoring messages transmitted from a user terminal;
detecting a content retransmission request message through the monitoring;
extracting terminal address information of the user terminal from the content retransmission request message when the content retransmission request message is detected;
checking whether the extracted terminal address information is included in the stored terminal access information about the user terminal receiving content from at least one other cache device;
if the extracted terminal address information is included in the stored terminal access information, notifying a handover of the user terminal to the at least one other cache device which sends the stored terminal access information, extracting content requested by the user terminal and providing the extracted content to the user terminal; and
after notifying the handover of the user terminal to the at least one other cache device,
receiving, from the at least one other cache device, content information including content identification information and information about a content interruption point to the user terminal by the at least one other cache device; and
providing, to the user terminal, data for a portion after the content interruption point among the content corresponding to the content identification information.

5. The method of claim 4, further comprising:
creating terminal access information including identification information of the cache device and terminal address information about a user terminal which provides the content; and
transmitting the created terminal access information to at least one other cache device adjacent to the cache device.

6. The method of claim 4, further comprising:
before the checking,
receiving terminal access information about the user terminal to which content is provided from the other cache device; and
storing the received terminal access information.

7. A cache control device, comprising:
a memory unit comprising a hardware memory configured to store, for each of a plurality of cache devices, terminal access information including terminal address information about one or more user terminals receiving content in a communication area of a particular cache device and identification information of the particular cache device, wherein the particular cache device is one of the plurality of cache devices, and the communication area is an area within a network in which the particular cache device resides; and
a control unit comprising one or more programmed processors configured to receive terminal access information about a user terminal receiving content from one of the plurality of cache devices,
to compare the received terminal access information with the terminal access information stored in the memory unit, and
to determine, based on the comparison, whether the user terminal is handed-over to the particular cache device, wherein the control unit is further configured, after determining that the user terminal is handed-over to the particular cache device,
to refer to the identification information contained in the terminal access information stored in the memory unit, and then to notify the handover of the user terminal to a previous cache device connected to the user terminal before the handover, and to transmit content transmission information to the particular cache device,
wherein the content transmission information includes information about a content interruption point from the previous cache device to the user terminal.

8. The cache control device of claim 7, wherein the control unit is further configured, if any terminal access information stored in the memory unit has matched terminal address information but mismatched identification information of the cache device, to determine that the user terminal is handed-over.

9. The cache control device of claim 7, wherein the control unit is further configured, after determining that the user terminal is handed-over, to refer to the identification information contained in the terminal access information stored in the memory unit, and then to notify the handover of the user terminal to a previous cache device connected to the user terminal before the handover.

10. The cache control device of claim 9, wherein the control unit is further configured, after determining that the user terminal is handed-over, to transmit content transmission information to the cache device, the content transmission information including information about content data transmitted from the previous cache device to the user terminal.

11. The cache control device of claim 9, wherein the control unit is further configured to receive content transmission information from the previous cache device, the content transmission information including information about content data transmitted from the previous cache device to the user terminal.

12. The cache control device of claim 7, wherein the control unit is further configured to store the received terminal access information in the memory unit if the user terminal is not handed-over, and to replace the cache device identification information contained in the stored terminal access information with the cache device identification information contained in the received terminal access information if the user terminal is handed-over.

13. The cache control device of claim 7, wherein the terminal access information is transmitted from the cache device to the cache control device when the cache device detects a content request message or a content retransmission request message transmitted by the user terminal.

14. A method performed by the one or more programmed processors included in the cache control device of claim 7 for detecting a handover, the method comprising:

storing, by the one or more programmed processors, for each of a plurality of cache devices distributed in a network, terminal access information including terminal address information about one or more user terminals receiving content in a communication area of a particular cache device and identification information of the particular cache device, wherein the particular cache device is one of the plurality of cache devices, and the communication area is an area within the network in which the particular cache device resides;

receiving, by the one or more programmed processors, terminal access information about a user terminal receiving content from one of the cache devices;

by comparing the received terminal access information with the stored terminal access information, determining, by the one or more programmed processors, whether the user terminal is handed-over to the particular cache device;

after determining that the user terminal is handed-over to the particular cache device, referring to the identification information contained in the terminal access information and notifying the handover of the user terminal to a previous cache device connected to the user terminal before the handover; and transmitting content transmission information to the particular cache device, wherein the content transmission information includes information about a content interruption point from the previous cache device to the user terminal.

15. The method of claim 14, wherein the terminal access information is transmitted from the cache device to the cache control device when the cache device detects a content request message or a content retransmission request message transmitted by the user terminal.

* * * * *